United States Patent
Bolden

(10) Patent No.: US 7,721,779 B2
(45) Date of Patent: May 25, 2010

(54) TUBELESS BICYCLE TIRE

(76) Inventor: Hal Pee Bolden, 3104 Halsell St., Monroe, LA (US) 71201

( * ) Notice: Subject to any disclaimer, the term of this patent is extended or adjusted under 35 U.S.C. 154(b) by 744 days.

(21) Appl. No.: 11/585,809

(22) Filed: Oct. 25, 2006

(65) Prior Publication Data

US 2007/0039673 A1   Feb. 22, 2007

Related U.S. Application Data

(63) Continuation-in-part of application No. 11/200,672, filed on Aug. 10, 2005, now abandoned.

(60) Provisional application No. 60/679,414, filed on May 11, 2005.

(51) Int. Cl.
  *B60C 3/02* (2006.01)
  *B60C 19/04* (2006.01)
(52) U.S. Cl. .................... 152/453; 152/515
(58) Field of Classification Search ............. 152/515, 152/453
  See application file for complete search history.

(56) References Cited

U.S. PATENT DOCUMENTS 2,953,184 A * 9/1960 Erstad ................... 152/453

FOREIGN PATENT DOCUMENTS

FR   2 669 276 A1 * 5/1992

* cited by examiner

*Primary Examiner*—Adrienne C Johnstone
(74) *Attorney, Agent, or Firm*—Browdy and Neimark, PLLC

(57) ABSTRACT

A tubeless tire includes a tread portion, two sidewalls, an interfacing material integrally formed between the two sidewalls of a pliable, flexible yet reliable material, two beads extending outwardly from the tire, delimiting a section formed by the interfacing material, and an air valve stem provided on the interfacing material. The thickness of the interfacing material is substantially the same as the thickness of the two sidewalls, and the beads project outwardly of an outer surface of the interfacing material. The beads are disposed in a position such that when the tire is mounted on a rim, the beads will fit within the rim, when the tire is inflated on the rim using the air valve stem, the interfacing material will expand, causing the beads to fit tightly within the rim, thus fixing the tire on the rim, and there is no sealing layer within the tire.

1 Claim, 1 Drawing Sheet

TUBELESS BICYCLE TIRE

This application claims the priority benefit of U.S. patent application Ser. No. 11/200,672, filed on Aug. 10, 2005, which claims priority to provisional application No. 60/679,414, filed on May 11, 2005, the entire descriptions of which are incorporated herein by reference.

FIELD

The present invention relates to a tubeless bicycle tire which may be implemented on a standard rim.

BACKGROUND

There are known types of tubeless bicycle tires, examples of which are found in U.S. Pat. No. 2,953,184 to Erstad, U.S. Pat. No. 5,538,058 to Aloy, and United States Published Application No. 2002/0040749 to Liu.

SUMMARY OF THE INVENTION

An object of the present invention is to provide a tubeless bicycle tire which can be made available in a variety of sizes for all popular wheel diameter and widths.

It is a further object of the present invention to provide a tubeless bicycle tire which can be mounted very easily on a standard rim.

The scope and content of the present invention is not intended to be limited by or to the above mentioned objects.

Briefly, the invention is characterized in particular by a tubeless tire without an inner tube or sealing layer. The tubeless tire comprises a tread portion, two sidewalls, each adjacent one end of the tread portion and thinner than the tread portion, an interfacing material integrally formed between the two sidewalls of a pliable, flexible yet reliable material, two beads extending outwardly from the tire, delimiting a section formed by the interfacing material, and an air valve stem provided on the interfacing material. The thickness of the section formed by the interfacing material is substantially the same as the thickness of the two sidewalls, and the beads project outwardly of an outer surface of the interfacing material. The beads are disposed in a position such that when the tire is mounted on a rim, the beads will fit within the rim. When the tire is inflated on the rim using the air valve stem, the interfacing material will expand, causing the beads to fit tightly within the rim, thus fixing the tire on the rim, and there is no sealing layer within the tire.

BRIEF DESCRIPTION OF THE DRAWINGS

For better understanding of the invention and additional objects and advantages thereof, reference is made to the following detailed description and accompanying drawing of a preferred embodiment, wherein.

DETAILED DESCRIPTION

Figure 1:
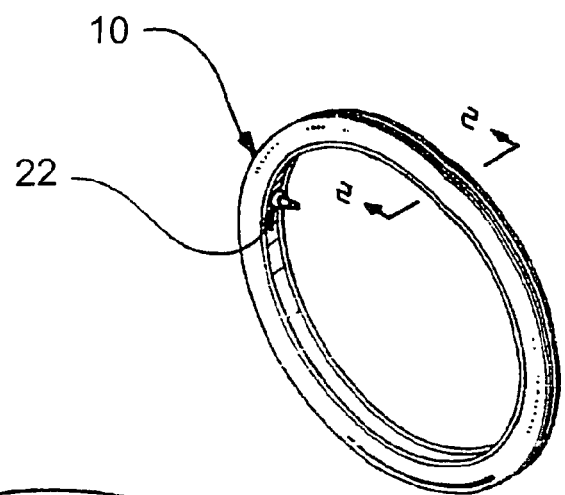
FIG. 1 is perspective view of the tubeless bicycle tire, in accordance with one embodiment of the present invention.
Figure 2:
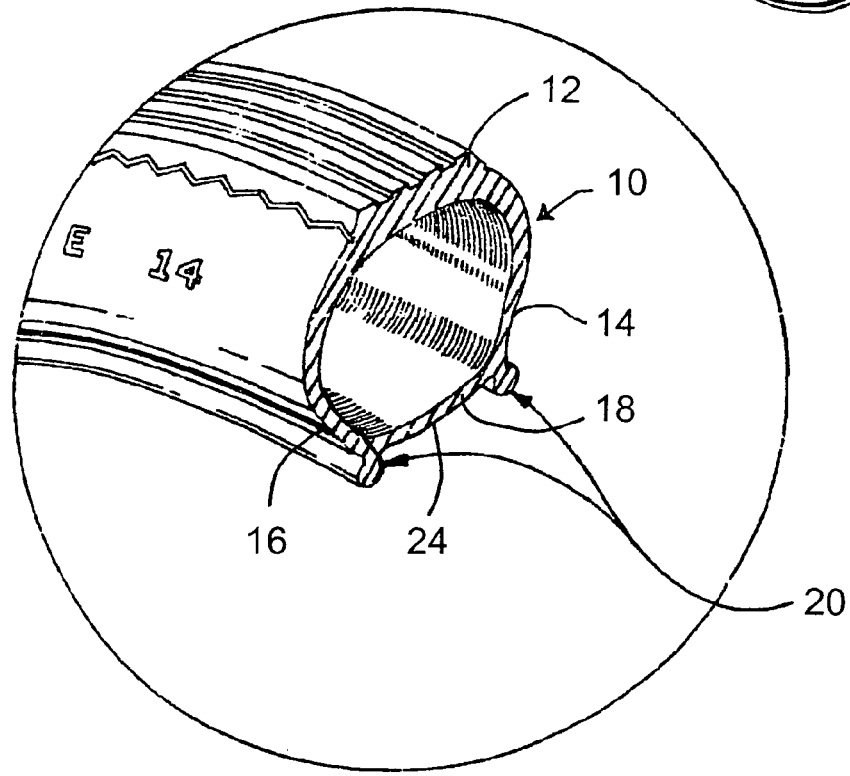
FIG. 2 is an exploded view of a cross section of FIG. 1 along the line 2-2 in accordance with one embodiment of the present invention.

The invention will be described in general with reference to FIGS. 1-2, which illustrate one embodiment of the tubeless bicycle tire 10 according to the present invention. The tire 10 shown in FIGS. 1 and 2 is shown in its inflated configuration.

A tubeless tire 10 is provided which comprises a tread portion 12, two sidewalls 14 and 16, each adjacent a respective end of the tread portion 12 and thinner than the tread portion, and an interfacing material 18 integrally formed between the sidewalls 14 and 16. Two beads 20 extend outwardly from the tire 10, delimiting the section formed by the interfacing material 18. The thickness of the section formed by the interfacing material 18 is substantially the same as the thickness of the sidewalls 14 and 16, and the beads 20 project axially outwardly and radially inwardly of the outer surface 24 of the interfacing material 18. The beads 20 are disposed in a position such that when the tubeless tire 10 is mounted on a rim (not shown), the beads 20 will fit within the rim.

The interfacing material 18 is a pliable, flexible yet reliable material. An air valve stem 22 is provided on the interfacing material 18, facing inwardly so as to be able to be inserted in a hole (not shown) in the rim when the tire is mounted on the rim. The material used to make the tire 10 can be a standard rubber used for bicycle tires. The materials to be used to make the interfacing material 18 are ones which will provide the function of being reliable, strong, elastic, pliable, and approximately the same thickness as the material used for the sidewalls 14, 16 of the tire 10. The pliable interfacing material 18 is a material which will expand upon inflation to allow fixing of the tire on the rim, and contract upon deflation, to allow easy removal of the tire from the rim. The materials of the tire 10 and the interfacing material 18 are selected in accordance with the skill of the ordinary art so as to have the properties described herein. There is no sealing layer within the tire, such as that found in U.S. Pat. No. 2,953,184.

Upon inflation of the tire 10 by pumping air into the tire, the interfacing material will expand, and cause the beads 20 to move tightly against the rim, thus fixing the tire 10 on the rim. The interfacing material thus expanded, will cause the tire to inflate to a uniform air rating on a standard rim.

The tire according to the present invention can be made available in a variety of sizes for all popular wheel diameters and widths. The tire is constructed of a tough, durable rubber for use on a standard bicycle rim. Styles can be made for all races, BMX bicycles and other uses. Because of the ease of use, even a person without skill or knowledge can mount this tire on a rim.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

What is claimed is:

1. A tubeless bicycle tire comprising:
   a tread portion;
   two sidewalls, each adjacent one end of the tread portion and being thinner than the tread portion;

an interfacing material integrally formed between the two sidewalls of a pliable, flexible yet reliable material;

two beads extending outwardly from the tire, delimiting a section formed by the interfacing material;

an air valve stem provided on the interfacing material, and wherein a thickness of the section formed by the interfacing material is substantially the same as a thickness of the two sidewalls, and the beads project axially outwardly and radially inwardly of an outer surface of the interfacing material, wherein the beads are disposed in a position such that when the tire is mounted on a rim, the beads will fit within the rim, wherein when the tire is inflated on the rim using the air valve stem, the interfacing material will expand, causing the beads to fit tightly within the rim, thus fixing the tire on the rim, and wherein there is no sealing layer within the tire.

* * * * *